United States Patent Office 3,644,375
Patented Feb. 22, 1972

3,644,375
LACTAM DICARBOXYLIC ACIDS AND PROCESS FOR PRODUCING THEM
Tsuneo Kobayashi and Kenichi Morita, Kanagawa, Hiroshi Kitagawa, Nagoya-shi, Aichi, Toshimitsu Yokoyama, Aichi, and Shigeo Makida, Kyoto, Japan, assignors to Toray Industries, Inc., Chuo-ku, Tokyo, Japan
No Drawing. Filed May 2, 1969, Ser. No. 821,493
Claims priority, application Japan, Oct. 18, 1968,
43/75,583
Int. Cl. C07d 27/08, 29/22
U.S. Cl. 260—293.62                    26 Claims

ABSTRACT OF THE DISCLOSURE

Lactam dicarboxylic acids represented by the general formula:

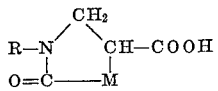

R represents a hydrogen atom or a hydrocarbon group having less than 20 carbon atoms. M represents either

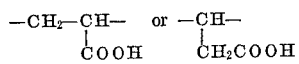

Derivatives of the lactam dicarboxylic acid are also disclosed.

Process for preparing the diester or diamide of the above lactam dicarboxylic acid which comprises reacting 3-butene-1,2,3-tricarboxylic acid triester with ammonia or a primary amine having less than 20 carbon atoms is also disclosed.

BACKGROUND OF THE INVENTION

Field of the invention

The present invention relates to novel lactam carboxylic acids, derivatives thereof, and to a process for producing said carboxylic acids and derivatives thereof.

SUMMARY OF THE INVENTION

The present invention comprises a novel lactam dicarboxylic acid compound, and the carboxylic acid derivative thereof. These compounds may be represented by the general formula:

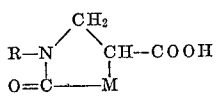

wherein R represents a hydrogen or a hydrocarbon group having less than 20 carbon atoms, and M represents

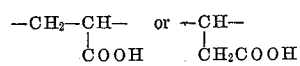

The derivatives thereof comprise the metal salts esters, amides, acid anhydrides, and acid halides of the above-defined lactam dicarboxylic acids.

The invention further comprises a process for the preparation of diesters and the diamides of the above lactam dicarboxylic acid. The process basically comprises reacting a 3-butene-1,2,3-tricarboxylic acid triester with ammonia or a primary amine having less than 20 carbon atoms.

Preferred molar ratios and temperatures are 0–300° C. (20–200° C. most preferred) and 1–15 moles of ammonia or the primary amine per mole of the triester.

Accordingly, one object of the present invention is to provide a novel lactam dicarboxylic acid as described above.

A further object of the present invention is to provide novel carboxylic acid derivatives as defined above.

Still yet another object of the present invention is to provide a process for the formation of diesters and of diamides of the lactam dicarboxylic acid as identified above.

Still yet a further object of the present invention is to teach one skilled in the art methods for manufacturing various derivatives of the lactam dicarboxylic acid above defined.

DESCRIPTION OF THE PREFERRED EMBODIMENTS

The compounds of this invention are lactam dicarboxylic acids and the carboxylic acid derivatives thereof which are represented by the general formula:

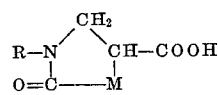

wherein R represents a hydrogen or a hydrocarbon group having less than 20 carbon atoms, and M represents

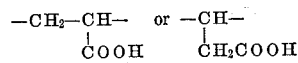

More practically, the compounds of the present invention are the 6-membered ring and 5-membered ring lactam carboxylic acids represented by the general formulas

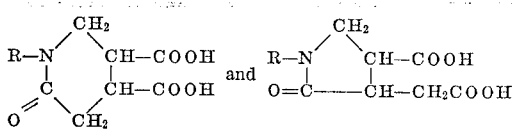

wherein R is as defined above, respectively, and metal salts, esters, amides, acid anhydrides, and acid halides of these lactam dicarboxylic acids.

The compounds of the present invention may be utilized as raw materials for forming various polymers as well as being useful as a chelating agent, and in particular the compounds have excellent properties as a surface active agent. For example, the metal salts, such as alkali metal salts or alkaline earth salts, of the lactam dicarboxylic acids have an excellent effect as a lubricating agent for filaments of synthetic resins, such as polyester and polyamide resins, due to the surface active property thereof.

Group R in the aforesaid general formula is hydrogen or a hydrocarbon group having less than 20 carbon atoms (as mentioned above). Illustrative of such hydrocarbons are alkyl groups such as a methyl group, an ethyl group, a propyl group, a butyl group, a hexyl group, a heptyl group, an octyl group, a nonyl group, a dodecyl group, a tetradecyl group, a hexadecyl group, an octadecyl group, or an eicocyl group; alkenyl groups such as an oleyl group; aryl groups such as a phenyl group, a tolyl group or a naphthyl group; cycloalkyl groups such as a cyclohexyl group, a cyclooctyl group, or a cyclododecyl group; or an arylalkyl group such as a benzyl group or a phenylethyl group. Among these, an alkyl group having less than 20 carbon atoms, a cycloalkyl group having 5–12 carbon atoms, a monocyclic aryl group having 5–12 carbon atoms, and a monocyclic arylalkyl group having 5–12 carbon atoms are most preferably employed.

As the esters of the carboxylic acids, there may be employed substantially any ester, but particularly a dialkyl ester thereof having less than 6 carbon atoms is most preferably used. Furthermore, there can also be employed lactam dicarboxylic acid esters having introduced therein a phenyl group, a cyclohexyl group, or a benzyl group, or these groups each having a substituent such as a tolyl group, a methylhexyl group, a 4-methylbenzyl group, etc.

As metals forming the metal salts of the lactam dicarboxylic acids of this invention, there are alkali metals such as sodium, potassium and lithium; alkaline earth metals such as barium, calcium, magnesium, and the like; and other metals such as silver, zinc, copper, nickel, iron and the like.

The amide or the ester of the lactam dicarboxylic acid of this invention may be prepared by reacting a 3-butene-1,2,3-tricarboxylic acid triester and ammonia or a primary amine having less than 20 carbon atoms. The reaction can be conducted under pressure or at normal pressure. In this invention, the amount of ammonia or a primary amine can be determined according to the amount used in an ordinary stoichiometric reaction, and is in general 0.3 mole equivalents to a large excess thereof, preferably 0.5 to 15 mole equivalents, based on 3-butene-1,2,3-tricarboxylic acid triester. When an excess of ammonia or a primary amine is used the amide of the lactam dicarboxylic acid generally forms.

The aforesaid 3-bentene-1,2,3-tricarboxylic acid triester used in the process of this invention may be readily prepared by reacting, for example, an acrylic acid ester and a maleic acid ester or a fumaric acid ester using tertiary phosphine as a catalyst. Any kind of ester portion of the 3-butene-1,2,3-tricarboxylic triester can be used in this invention, but an alkyl ester having less than 6 carbon atoms such as a trialkyl ester having any one of methyl, ethyl, propyl, butyl, pentyl and hexyl groups is preferred. In addition to the above esters, there may be employed a phenyl ester, a cyclohexyl ester, or a benzyl ester having a substituent inactive to the reaction.

Ammonia or the primary amine which is one of the reaction components forms the R—N bond in the aforesaid general formula and is represented by the formula R—$NH_2$. Examples of these compounds are ammonia; an alkyl amine such as methylamine, ethylamine, hexylamine, octylamine, nonylamine, propylamine, butylamine, decylamine, dodecylamine, tetradecylamine, hexadecylamine, octadecylamine, eicocylamine, etc.; a cycloalkylamine such as cyclopentylamine, cyclohexylamine, cyclooctylamine, cyclododecylamine, etc.; an arylamine such as aniline, tolylamine, naphthylamine, etc.; and an arylalkylamine such as benzylamine, phenylethylamine, etc.

The reaction is usually conducted at a temperature of about 0° C. to about 300° C. If the reaction temperature is lower than 0° C., the rate of reaction is low, while if the reaction temperature is higher than 300° C., decomposition products are by-produced. In particular, a temperature of about 20° C. to about 200° C. is preferable.

A reaction medium is not always necessary but a proper organic solvent is, of course, employed in the reaction. In such a case, as the organic solvent, there are illustrated aliphatic hydrocarbons, aromatic hydrocarbons, and ethers. Examples are hexane, heptane, octane, benzene, toluene, xylene, dioxane, dimethylformamide, and the like.

In the process of the present invention, the use of a catalyst is not always necessary, but it is preferred to use a basic catalyst such as an alkali metal alkoxide, e.g., sodium methoxide, potassium methoxide, sodium ethoxide, potassium-tert-butoxide, sodium-tert-butoxide, etc., or a tertiary amine, e.g., triethylamine, tributylamine, pyridine, lutidine, picoline, quinoline, etc. They may be used in catalytic amounts.

The lactam dicarboxylic acid ester formed may be converted into a derivative thereof by the following well known basic procedure. Generally, the lactam dicarboxylic acid ester is converted into the free dicarboxylic acid or the alkali metal salt thereof by an acid or alkaline hydrolysis. The free carboxylic acid is readily esterified again by conventional methods. Also, the free dicarboxylic acid can be converted into the acid anhydride, acide halide, etc., by standard techniques.

For example, the esterification may be conducted by reacting the dicarboxylic acid and an alcohol using an acid catalyst such as sulfuric acid, p-toluene sulfonic acid, or hydrogen chloride. By reacting the dicarboxylic acid with acetic anhydride, acetyl chloride, phosphorus oxychloride, etc., the acid anhydride can be obtained, and by reacting the dicarboxylic acid with phosphorus pentachloride, the acid chloride is obtained.

In the process of this invention, the 5-membered compound and the 6-membered compound are simultaneously formed. The formation ratio of both compounds is not markedly influenced by variations in the reaction conditions. In general, the proportion of the 6-membered product is 50–80% by weight of the total product. The separation of the 6-membered product from the 5-membered product can be conducted by conventional methods, such as recrystallization.

The compound of this invention can be converted into a polyamide or a polyester by polymerization with polyalcohols or polyamines. The polymer may be used as films and in fabricated products.

Among the compounds of this invention, examples of those having excellent properties as surface active agents are sodium N-ethylhexyl lactam dicarboxylate, sodium N-lauryl lactam dicarboxylate and sodium N-decyl lactam dicarboxylate. Examples of compounds of this invention excellent as textile oils for spinning are sodium N-stearyl lactam dicarboxylate (in addition to the above-mentioned lactam dicarboxylates).

When employing the compounds of the present invention as surface active agents, the product containing the 5-membered compound and the 6-membered compound prepared by the process of this invention can be used as a mixture thereof (without separating each compound).

Hereinafter, the compounds of this invention will be explained with reference to usage as a textile oil for synthetic fibers, which shows one utilization of the compounds of this invention.

The most suitable textile oil among the compounds of this invention is the mono- or di-alkali metal salt of the lactam dicarboxylic acid. This compound can reduce the influence of temperature or humidity on the smoothness-providing function of the textile oil, and can also enlarge the useful range of application of the compound. Moreover, the compound improves not only the smoothness of the synthetic fibers but also increases the function of providing antistatic properties to the synthetic fibers.

As is well known, in the case of using conventional textile oils, the compound of the present invention is usually used as a mixture thereof with a smoothing agent and, preferably, a nonionic or anionic surface active agent. The proportion of the compound of this invention in the mixture is preferably 1–30% by weight of the mixture.

As the smoothing agent, there can be used the prior art mineral oils and higher aliphatic esters. As higher aliphatic esters, there are preferably employed butyl stearate, butyl oleate and tridecyl oleate. Moreover, silicone oils and copolymers of propylene glycol and ethylene glycol may also be employed as the higher aliphatic esters. Of course, the smoothing agent used in this invention is not limited to those mentioned above, but can be any one employed generally as a smoothing agent for synthetic fibers in the present invention.

The treatment of synthetic fibers with such a textile oil composition can be conducted by directly immersing the synthetic fibers into the composition or by contacting the synthetic fibers with the surface of a rotary roller, the lower portion of which is immersed in the composition.

One striking merit of this invention is that by adding the compound of this invention, the antistatic effect of an anionic or nonionic surface active agent used as an antistatic agent can be improved. In other words, by the incorporation of the five-membered or six-membered ring lactam dicarboxylic acid derivative, the antistatic effect of the surface active agent becomes less influenced by temperature and humidity conditions, and hence the textile oil composition can be more widely applied than those of the prior art. In this case also, the amount of the compound is preferably 1–30% by weight of the mixture utilized.

As the nonionic surface active agent used in the aforesaid case there are polyoxyethylene oxide, lauryl ether, an oleyl ester of polyoxyethylene oxide, a nonylphenyl ether of polyoxyethylene oxide, sorbitan monopalmitate polyoxyethylene oxide, pentaerythritol, sorbitan monolaurate, a random or block copolymer of polypropylene glycol and polyethylene glycol.

As illustrative anionic surface active agents there are laurylbenzene sulfonate, octyl sulfate, sulfated oil, a polyoxyethylene oxide oleyl ether sulfonate, octyl phosphate, etc.

However, it should be understood that the nonionic and anionic surface active agents used in the present invention are not limited to the aforesaid ones and can be selected from the state of the art materials showing similar functions.

As the synthetic fibers treated by the textile oil of the present invention, there can be employed polyamide fibers, polyester fibers, polyacrylonitrile fibers, polyvinyl chloride fibers, polypropylene fibers, polyethylene fibers, and the like. Furthermore, in the term synthetic fibers there is also included semi-synthetic fibers, such as acetate fibers.

By applying a textile oil composition containing the compound of the present invention to the surfaces of synthetic fibers, the synthetic fibers are provided with excellent smoothness under wide ranges of temperature and humidity and the occurrence of cutting of fibers in the manufacturing of synthetic fibers as well as the formation of processing stains in a high-grade processing stage can be prevented. Moreover, when an antistatic agent is used together with the textile oil composition of this invention, the antistatic effect of the agent is further improved, and the antistatic agent can be used effectively under wide ranges of temperature and humidity. Therefore, by the practice of the present invention, synthetic fibers having improved properties can be manufactured smoothly and at high efficiency, and the synthetic fibers thus prepared can be processed smoothly and with high efficiency.

The invention will now be explained in further detail by the following examples.

Example 1

Into a glass ampoule there were charged 4.3 g. of trimethyl 3-butene-1,2,3-tricarboxylate and 2.0 g. of cyclohexyl amine and the ampoule was sealed. The reaction system was then reacted for four hours in a steam bath. After reaction was finished, unreacted raw materials were removed by distillation under high vacuum. The distillation residue was mixed with 3 g. of sodium hydroxide and 100 ml. of water, and the resulting mixture was heated, with stirring, for 11 hours at 70–80° C. in a nitrogen gas atmosphere. After the end of reaction, the reaction product was neutralized (or it can be acidified) with diluted hydrochloric acid and then subjected to distillation under reduced pressure to remove water therefrom. The distillation residue was continuously extracted using acetone, and after removing acetone from the extract by distillation, the crystals obtained from the distillation residue were washed with a small amount of acetone and filtered by suction to provide 2.9 g. of a product. By subjecting an aqueous solution of the product to fractional crystallization, there were obtained 1.4 g. of 1 - cyclohexyl - 2-oxo-4-carboxy-3-pyrrolidine acetic acid (M.P. 205–207° C.).

Elementary analysis as $C_{13}H_{19}O_5N$.—Calculated (percent): C, 57.98; H, 7.11; and N, 5.20. Found (percent): C, 57.98; H, 7.08; and N, 5.20; IR spectra, $V_{C=O}$ (carboxyl) 1730 cm.$^{-1}$ and 1710 cm.$^{-1}$ and $V_{CO}$ (amide) 1640 cm.$^{-1}$ and 1.3 g. of a mixture of the above compound and 1-cyclohexyl-6-oxo-3,4-piperidic acid (M.P. 188–190° C.).

Elementary analysis as $C_{13}H_{19}O_5N$.—Calculated (percent): C, 57.98; H, 7.11; and N, 5.20. Found (percent): C, 57.70; H, 7.03; and N, 5.21. IR spectra $V_{C=O}$ (amide) 1640 cm.$^{-1}$ and 1580 cm.$^{-1}$.

Example 2

A mixture of 2.3 g. of trimethyl 3-butene-1,2,3-tricarboxylate, 7.3 g. of n-butylamine, and 0.05 g. of sodium hydroxide was charged in a glass ampoule and, after sealing the ampoule, the reaction system was reacted for eight hours in a steam bath. By distilling the reaction product, 24 g. of lactam dicarboxylic acid esters were obtained. The boiling point of the product was 147–148° C. (0.1 mm. Hg).

The lactam dicarboxylic acid esters were a mixture of 1 - n - butyl-2-oxo-4-carboxymethoxy-3-pyrrolidine acetic acid methyl ester and 1-n-butyl-6-oxo-3,4-piperidic acid dimethyl ester. IR spectra $V_{CO}$ (ester) 1740 cm.$^{-1}$, $V_{CO}$ (amide) 1693 cm.$^{-1}$ and 1650 cm.$^{-1}$: From the ratio of their chromatographic areas, the ratio of the aforesaid components was confirmed to be 31%/69%.

Elementary analysis as $C_{13}H_{21}O_5N$.—Calculated (percent): C, 57.55; H, 7.80; and N, 5.16. Found (percent): C, 57.58; H, 7.75 and N, 5.20.

A mixture of 10 g. of the lactam dicarboxylic acid esters, 14 g. of sodium hydroxide, and 100 ml. of water was refluxed, under heating, for seven hours. After the reaction was finished, the product was neutralized with diluted hydrochloric acid and extracted with ether. The ether phase thus extracted was dried with sodium sulfate (anhydrous) and the ether was distilled off to provide 7.4 g. of residue, which was a mixture of 1-butyl-2-oxo-4-carboxyl-3-pyrrolidine acetic acid and 1-butyl-6-oxo-3,4-piperidic acid. When the residue was allowed to stand at room temperature, 1-butyl-6-oxo-3,4-piperidic acid crystallized. The melting point of the product was 167.5–168.5° C. and the yield thereof was 4.0 g.

Elementary analysis as $C_{11}H_{17}O_5N$.—Calculated (percent): C, 54.31; H, 7.04 and N, 5.70. Found: C, 54.01; H, 6.95; and N, 5.70. IR spectra $V_{CO}$ (amide) 1695 cm.$^{-1}$.

Example 3

Into a glass ampoule there were charged 6.9 g. of trimethyl 3-butene-1,2,3-tricarboxylate, 3.2 g. of benzylamine, and 3.2 g. of sodium hydroxide. After sealing the ampoule, the system was reacted for 15 hours in a steam bath. After the reaction was finished, the product was subjected to distillation using a high vacuum distillator to remove unreacted raw materials, the residue was mixed with 0.25 g. of sodium hydroxide and 100 ml. of water, and the resulting mixture was heated with stirring for 6 hours at 70–80° C. in a nitrogen gas atmosphere. An alkaline aqueous solution of the product was neutralized (or it can be acidified) with diluted hydrochloric acid and water was distilled off under reduced pressure from the solution. The residue obtained was continuously extracted with acetone and the acetone was removed by distillation to provide 2.2 g. of lactam dicarboxylic acid esters having a melting point of 165–175° C. The product was a mixture of 1-benzyl-2-oxo-4-carboxy-3-pyrrolidine acetic acid and 1-benzyl-6-oxo-3,4-piperidic acid.

Elementary analysis as $C_{14}H_{15}O_5N$.—Calculated (percent): C, 60.64; H, 5.45; and N, 5.05. Found (percent): C, 60.59; H, 5.40; and N, 5.08. IR spectra: $V_{CO}$ (carboxyl) 1730 cm.$^{-1}$ and 1710 cm.$^{-1}$, $V_{CO}$ (amide) 1645 cm.$^{-1}$ and 1580 cm.$^{-1}$.

By repeating the fractional crystallization of the product, 1-benzyl - 2 - oxo-4-carboxy-3-pyrrolidine acetic acid having a melting point of 173–175° C. was isolated.

IR spectra: $V_{C=O}$ (carboxyl) 1731 cm.$^{-1}$ and 1712 cm.$^{-1}$, $V_{C=O}$ (amide) 1645 cm.$^{-1}$ Example 4

Into a 100 ml. autoclave was charged 12 g. of trimethyl 3-butene-1,2,3-tricarboxylate, and after adding 10 ml. of liquid ammonia, the system was shaken for 16 hours at 60° C. After the reaction was finished, the crystals precipitated were recovered by filtration, washed with acetone and filtered to provide 10.5 g. of a mixture of 2-oxo-4-carbamido-3-pyrrolidine acetic acid amide and 6-oxo-3,4-piperdic acid diamide. When the above product was recrystallized from acetone containing water, the aforesaid six-membered amide having a melting point of 255–256° C. (decomposed) was obtained.

Elementary analysis as $C_7H_{11}O_3N_3$. ½ $H_2O$.—Calculated (percent): C, 43.29; H, 6.29 and N, 21.64. Found (percent): C, 43.48; H, 6.31; and N, 21.74. IR spectra:

$V_{N-H}$ 3350 cm.$^{-1}$ 3100 cm.$^{-1}$, $V_{CO}$ (amide) 1660, 1690, (shoulder)
and
1630 cm.$^{-1}$
(shoulder)

Example 5

Into 200 ml. of benzene there were dissolved 9.2 g. of trimethyl 3-butene-1,2,3-tricarboxylate and 4.0 g. of cyclohexylamine. The solution was refluxed under heating for 24 hours. After the reaction was finished, benzene was distilled off, and the unreacted raw materials were distilled off using a high vacuum distillator. When the residue was passed through a chromatographic column containing silica gel, 5 g. of lactam dicarboxylic acid esters were obtained as an oily product. When the oily product was distilled using a high vacuum distillator, a mixture of 1-cyclohexyl-2-oxo-4-carbomethoxy - 5 - pyrrolidine acetic acid methyl ester and 1 - cyclohexyl-6-oxo-3,4-piperidic acid dimethyl ester having a boiling point 165–167° C./ 0.05 mm. Hg was obtained.

Elementary analysis as $C_{15}H_{23}O_5N$.—Calculated (percent): C, 60.59; H, 7.80; and N, 4.71. Found (percent): C, 60.61; H, 7.71 and N, 4.68. IR spectra: $V_{CO}$ (ester) 1740 cm.$^{-1}$, $V_{CO}$ (amide) 1690 and 1640 cm.$^{-1}$.

Example 6

Into an autoclave there were charged 6.9 g. of trimethyl 3-butene-1,2,3-tricarboxylate, 1.8 g. of aniline and 0.3 g. of potassium-t-butoxide. The system was reacted at 140–170° C. overnight. After the reaction was finished, the unreacted raw materials were distilled off using a high vacuum distillator and the residue was treated chromatographically using silica gel to provide 1.0 g. of lactam dicarboxylic acid esters. By distilling the lactam dicarboxylic acid esters using a high vacuum distillator, they were confirmed to be a mixture of 1-phenyl-2-oxo-4-carbomethoxy-3-pyrrolidine acetic acid methyl ester and 1-phenyl-6-oxo-3,4-piperidic acid methyl ester. The ratio of these ingredients (by gas chromatographic analysis) was 41%/59%.

Elementary analysis as $C_{15}H_{17}NO_5$.—Calculated (percent): C, 61.85; H, 5.88; and N, 4.81. Found (percent): C, 61.58; H, 5.79 and N, 4.72. IR spectra: $V_{CO}$ (ester) 1740 cm.$^{-1}$, $V_{CO}$ (amide) 1690 cm.$^{-1}$ and 1645 cm.$^{-1}$ Example 7

Into 30 ml. of methanol, there was dissolved 23 g. of trimethyl 3-butene-1,2,3-tricarboxylate, and the solution was mixed with 15.35 g. of 11% (w./w.) ammoniac methanol solution in an autoclave. The system was shaken at 40–45° C. overnight. After reaction was finished, methanol was distilled off and the residue was cooled. Thereafter a small amount of acetone was added to the residue and crystals precipitated. The crystals were recovered by filtration to provide 13 g. of a mixture of 6-oxo-3,4-piperidic acid dimethyl ester and 2-oxo-4-carbomethoxy-3-pyrrolidine acetic acid methyl ester. By recrystallizing the product from acetone, 6-oxo-3,4-piperidic acid dimethyl ester having a melting point of 126° C. was obtained.

Elementary analysis as $C_9H_{13}O_5N$.—Calculated (percent): C, 50.23; H, 6.09; and N, 6.15. Found (percent): C, 50.38; H, 6.08; and N, 6.58. IR spectra: $V_{CO}$ (ester) 1740 cm.$^{-1}$, $V_{CO}$ (amide) 1665 cm.$^{-1}$.

When the filtrate was concentrated, a mixture of the aforesaid lactam dicarboxylic acid dimethyl esters having a melting point of 65–90° C. was obtained.

IR spectra: $V_{CO}$ (ester) 1735 cm.$^{-1}$, $V_{CO}$ (amide) 1660 cm.$^{-1}$ and 1690 cm.$^{-1}$ (shoulder)

Example 8

The same procedure as in Example 1 was repeated using each of 3-carbobutoxy-1,2-dicarboethoxy-3-butene,
3-carbomethoxy-1,2-dicarbobutoxy-3-butene,
3-carbomethoxy-1,2-dicarbocyclohexyloxy-3-butene,
3-carbophenoxy-1,2-dicarbomethoxy-3-butene,
3-carbobutoxy-1,2-dicarboallyloxy-3-butene,
3-carbobutoxy-1,2-dicarbobenzyloxy-3-butene, and
1,2,3-tricarbopropoxy-3-butene as the tricarboxylic acid triester instead of trimethyl 3-butene-1,2,3-tricarboxylate. The lactam dicarboxylic acid esters or a mixture of 6-oxo-3,4-piperidic acid diester and 2-oxo-4-carboalkoxy-3-pyrrolidine acetic acid ester shown in Table 1 was obtained with yields of from 50 to 95% by weight.

TABLE 1

$$CH_2=C-CO_2R^1$$
$$|$$
$$CH-CO_2R^2 \text{ (Raw material)}$$
$$|$$
$$CH_2-CO_2R^2$$

| R¹ | R² | B.P. °C./ mm.Hg | Yield, percent | IR (cm.⁻¹) | Elementary analysis |||||| 
| --- | --- | --- | --- | --- | --- | --- | --- | --- | --- | --- |
| | | | | | Calculated ||| Found |||
| | | | | | | C | H | N | C | H | N |
| n-Bu | Et | 180–185/0.1 | 68 | $V_{C-O}$ (ester), 1735 $V_{C-O}$ (amide), 1690, 1650 | $C_{19}H_{31}O_5N$ 64.56 | 8.84 | 3.96 | 64.25 | 8.90 | 3.99 |
| Me | n-Bu | 168–175/0.05 | 85 | $V_{C-O}$ (ester), 1735 $V_{C-O}$ (amide), 1695 | $C_{18}H_{29}O_5N$ 63.69 | 8.61 | 4.13 | 63.55 | 8.35 | 4.31 |
| Me | —⟨H⟩ | Oil | 60 | $V_{C-O}$ (ester), 1740 $V_{C-O}$ (amide), 1690 | $C_{20}H_{31}O_5N$ 63.75 | 8.55 | 3.83 | 65.44 | 8.49 | 3.96 |
| ⟨ ⟩ | CH₃ | Oil | 50 | $V_{C-O}$ (ester), 1730 $V_{C-O}$ (amide), 1695, 1645 | $C_{20}H_{25}O_5N$ 66.83 | 7.01 | 3.90 | 66.43 | 6.90 | 4.21 |
| n-Bu | Alkyl | 190–196/0.3 | 65 | $V_{C-O}$ (ester), 1740 $V_{C-O}$ (amide), 1690, 1640 | $C_{20}H_{31}O_5N$ 65.73 | 8.55 | 3.83 | 65.66 | 8.46 | 3.98 |
| n-Bu | CH₂—⟨ ⟩ | Oil | 56 | $V_{C-O}$ (ester), 1740 $V_{C-O}$ (amide), 1695, 1650 | $C_{24}H_{33}O_5N$ 69.37 | 8.01 | 3.37 | 68.98 | 4.23 | 3.59 |
| n-Pr | n-Pr | 165–169/0.05 | 15 | $V_{C-O}$ (ester), 1735 $V_{C-O}$ (amide), 1690, 1650 | $C_{19}H_{31}O_5N$ 64.56 | 8.84 | 3.96 | 64.48 | 8.77 | 3.98 |

EXAMPLE 9

A mixture of 516 g. of 3-butene-1,2,3-tricarboxylic acid (3-methyl-1,2-diethyl) ester and 258 g. of 2-ethylhexylamine was reacted overnight at 180° C. in an argon atmosphere. After the reaction was finished, the product was distilled using a high vacuum distillator to provide 411 g. of a mixture of 1-(2-ethylhexyl)-2-oxo-4-carbomethoxy-3-pyrrolidine acetic acid ester and 1-(2-ethylhexyl)-6-oxo-3,4-piperidic acid (3-methyl-4-ethyl) ester having a boiling point of from 157 to 187° C./1.4 mm. Hg.

IR spectra: $V_{CO}$ (ester) 1740 cm.⁻¹, $V_{CO}$ (amide) 1695 cm.⁻¹, 1653 cm.⁻¹.

A mixture of 411 g. of the above lactam dicarboxylic acid diesters, 96.3 g. of sodium hydroxide, and 700 ml. of water was refluxed under heating for six hours. After reaction was finished, the unreacted reactants were extracted with ether. When the aqueous phase was strongly acidified with concentrated hydrochloric acid and extracted with ether and the ether phase was dried with sodium sulfate (anhydrous) and the ether was distilled off, 33.0 g. of an oily product was obtained. When the product was allowed to stand, the product crystallized.

The product was then recrystallized from a water-methanol solvent to provide 149 g. of the crystals of 1-(2-ethylhexyl)-6-oxo-3,4-piperidic acid having a melting point of 179–180.7° C.

Elementary analysis as $C_{15}H_{25}O_5N$.—Calculated (percent): C, 60.18; H, 8.42; N, 4.68. Found (percent): C, 60.28; H, 8.33; N, 4.74. IR spectra: $V_{CO}$ (carboxyl) 1695 cm.⁻¹ and 1710 cm.⁻¹, $V_{CO}$ (amide) 1592 cm.⁻¹.

By concentrating the filtrate, 181 g. of a mixture of 1-(2-ethylhexyl)-2-oxo-4-carboxy-3-pyrrolidine acetic acid and 1-(2-ethylhexyl)-6-oxo-3,4-piperidic acid was obtained as an oily product.

IR spectra: $V_{CO}$ (carboxyl) 1730 cm.⁻¹ and 1710 cm.⁻¹, $V_{CO}$ (amide) 1645 cm.⁻¹ and 1605 cm.⁻¹ (shoulder).

EXAMPLE 10

A mixture of 516.32 g. of 3-butene-1,2,3-tricarboxylic acid (3-methyl-1,2-diethyl) ester and 370.78 g. of lauryl-amine was heated overnight at 150° C. in an argon atmosphere. After reaction finished, the product was distilled to provide 575.8 g. of a mixture of 1-lauryl-6-oxo-3,4-piperidic acid-3-methyl-4-ethyl ester having a boiling point of 230–238° C./1.9 mm. Hg.

Elementary analysis as $C_{22}H_{39}O_5N$.—Calculated (percent): C, 66.46; H, 9.89; N, 3.52. Found (percent): C, 66.21; H, 9.65; N, 3,78. IR spectra: $V_{CO}$ (ester) 1740 cm.⁻¹, $V_{CO}$ (amide) 1690 cm.⁻¹ and 1650 cm.⁻¹.

EXAMPLE 11

Into 100 ml. of methanol there were dissolved 44 g. of the mixture of the lactam dicarboxylic acid esters prepared according to the process of Example 10 and 14.5 g. of potassium hydroxide, and the solution was refluxed under heating for 3 hours followed by allowing to stand overnight. After the reaction was finished, the product was concentrated and dried under reduced pressure to provide 45.8 g. of the dipotassium salts of the esters.

IR spectra: $V_{CO}$ (carboxylate) 1580 cm.⁻¹ and 1400 cm.⁻¹.

EXAMPLE 12

Into a glass ampoule there were charged 10 g. of trimethyl 3-butene-1,2,3-tricarboxylate and 11.7 g. of stearylamine, and after sealing the ampoule, the system was heated for 20 hours at 100° C.

After the reaction was finished, the oily product was added to 300 ml. of 20% hydrochloric acid and the resulting solution was refluxed under heating for two days. When the product was allowed to cool overnight, the product solidified as the upper layer of the aqueous solution. The solidified product was recovered, dissolved in ether, washed with water, and after treatment with activated carbon, dried with sodium sulfate (anhydrous). After removing ether by distillation, the product was dried under a reduced pressure to provide 11.5 g. of a mixture of 1-stearly-2-oxo-4-carboxyl-3-pyrrolidine acetic acid and 1-stearyl-6-oxo-3,4-piperidic acid having a melting point of 80–90° C.

IR spectra: $V_{CO}$ (carboxyl) 1720, 1740, 1760 cm.⁻¹ (shoulder) (shoulder)

$V_{CO}$ (amide) 1645 and 1660 cm.⁻¹

Example 13

Into a glass ampoule there were charged 4.6 g. of trimethyl 3-butene-1,2,3-tricarboxylate and 6.2 g. of a 10% (w./w.) methylamine-methanol solution. After sealing the ampoule, the system was reacted for three weeks at room temperature. After the reaction was finished, methanol was distilled off and the product was further distilled using a high vacuum distillator to provide 3.9 g. of a mixture of 1-methyl-2-oxo-4-carbomethoxy-3-pyrrolidine acetic acid methyl ester and 1-methyl-6-oxo-3,4-piperidic acid dimethyl ester having a boiling point of 125–128° C./0.08 mm. Hg. The ratio of these ingredients (by gas chromatograph analysis) was 25%/75%.

Elementary analysis as $C_{10}H_{15}NO_5$.—Calculated (percent): C, 52.39; H, 6.60; N, 6.11. Found (percent): C, 52.28; H, 6.54; N, 6.13. IR spectra: $V_{CO}$ (ester) 1738 cm.$^{-1}$, $V_{CO}$ (amide) 1690 cm.$^{-1}$ and 1645 cm.$^{-1}$

Example 14

Into a glass ampoule there were charged 4.6 g. of trimethyl 3-butene-1,2,3-tricarboxylate and 1.18 g. of n-propylamine. After sealing the ampoule, the system was heated overnight at 80° C. After the reaction was finished, the reaction product was distilled to provide 4.85 g. of a mixture of 1-propyl-2-oxo-4-carbomethoxy-3-pyrrolidine acetic acid methyl ester and 1-propyl-6-oxo-3,4-piperidic acid dimethyl ester having a boiling point of 145–147° C./0.1 mm. Hg. The ratio of the ingredients was confirmed to be 28%/72% by chromatographic analysis.

Elementary analysis as $C_{12}H_{19}NO_5$.—Calculated (percent): C, 56.02; H, 7.44; N, 5.44. Found (percent): C, 55.88; H, 7.39; N, 5.51. IR spectra: $V_{CO}$ (ester) 1740 cm.$^{-1}$, $V_{CO}$ (amide) 1690 cm.$^{-1}$ and 1645 cm.$^{-1}$

Example 15

Into 200 ml. of methanol there was dissolved 5.0 g. of 1-cyclohexyl-2-oxo-4-carboxy-3-piperidic acid. To the methanol solution prepared above, there was added, dropwise, an aqueous solution of 1.5 g. of sodium hydroxide in 5 ml. of water under ice-cooling. After the addition, the system was placed on a steam bath for a period until crystals were precipitated. By recovering the crystals, 3.5 g. of the disodium salt of the above acid was obtained.

IR spectra: $V_{CO}$ (carboxylate) 1570 cm.$^{-1}$, 1415 cm.$^{-1}$, $V_{CO}$ (amide) 1685 cm.$^{-1}$.

2 g. of the sodium salt prepared as a precipitate was reacted with calcium sulfate by a standard procedure and the product was washed with ethanol to provide 1.5 g. of the calcium salt thereof.

Example 16

Into a round bottom flask there were charged 4.6 g. of trimethyl 3-butene-1,2,3-tricarboxylate, 2.0 g. of cyclohexylamine, and 50 ml. of dioxane. The system was refluxed under heating for 25 hours. After removing dioxane by distillation at normal pressure, the residue was distilled using a high vacuum distillator to provide 3.5 g. of a mixture of 1-cyclohexyl-2-oxo-4-carbomethoxy-3-pyrrolidine acetic acid and 1-cyclohexyl-6-oxo-3,4-piperidic acid dimethyl ester. The IR spectra thereof were the same as those of the product of Example 5. The ratio of the ingredients was confirmed to be 69%/31% by gas chromatographic analysis.

Example 17

Into a reaction flask there were charged 15.0 g. of trimethyl 3-butene-1,2,3-tricarboxylate, 7.0 g. of benzylamine and 50 ml. of dimethylformamide, and the system was refluxed by heating for 15 hours. After the reaction was finished, the unreacted raw materials were distilled off and the residue was subjected to high vacuum distillation to provide 10.2 g. of a mixture of 1-benzyl-2-oxo-4-carbomethoxy-3-pyrrolidine acetic acid and 1-benzyl-6-oxo-3,4-piperidic acid dimethyl ester. These ingredients were confirmed to be present at a ratio of 43% to 57% by gas chromatographic analysis.

Elementary analysis as $C_{16}H_{19}O_5N$.—Calculated (percent): C, 62.94; H, 6.27; N, 4.59. Found (percent): C, 62.88; H, 6.20; N, 4.59. IR spectra: $V_{C=O}$ (ester) 1740 cm.$^{-1}$, $V_{C=O}$ (amide) 1690 cm.$^{-1}$ and 1645 cm.$^{-1}$

Example 18

Into a glass ampoule there were charged 6.9 g. of trimethyl 3-butene-1,2,3-tricarboxylate and 5.5 g. of cyclododecylamine. After sealing the ampoule, the system was reacted overnight at 150° C.

After the reaction was finished, unreacted raw materials were removed by distillation under reduced pressure and the residue was treated in a column chromatograph using silica gel to provide 8.4 g. of a mixture of 1-cyclododecyl-2-oxo-4-carbomethoxy-3-pyrrolidine acetic acid methyl ester and 1-cyclododecyl-6-oxo-3,4-piperidic acid dimethyl ester.

Elementary analysis as $C_{21}H_{35}O_5N$.—Calculated (percent): C, 66.11; H, 9.25; N, 3.67. Found (percent): C, 65.80; H, 9.11; N, 3.89. IR spectra: $V_{C=O}$ (ester) 1730 cm.$^{-1}$, $V_{C=O}$ (amide) 1690 cm.$^{-1}$ and 1650 cm.$^{-1}$

Example 19

Into a glass ampoule there were charged 4.6 g. of trimethyl 3-butene-1,2,3-tricarboxylate and 2.9 g. of α-naphthylamine. After sealing the ampoule, the system was reacted for five hours at 180–190° C. After the reaction was finished, the reaction product was mixed with ether and diluted hydrochloric acid whereby the product was extracted.

The ether layer thus recovered was washed with water, dried with sodium sulfate (anhydrous), and after the ether was distilled off, unreacted butene tricarboxylate was distilled under reduced pressure. The residue was treated in a silica gel-packed column to provide 1.2 g. of a mixture of 1-naphthyl-2-oxo-4-carbomethoxy-3-pyrrolidine acetic acid methyl ester and 1-naphthyl-6-oxo-3,4-piperidic acid dimethyl esters.

IR spectra: $V_{C=O}$ (ester) 1730 cm.$^{-1}$, $V_{C=O}$ (amide) 1690 cm.$^{-1}$ and 1645 cm.$^{-1}$.

Example 20

Into a glass ampoule there were charged 2.3 g. of trimethyl 3-butene-1,2,3-tricarboxylate and 3.1 g. of eicocylamine. After sealing the ampoule, the system was heated to 130° C. overnight. After the reaction was finished, the reaction product was treated in a column chromatograph using neutral alumina and a column chromatograph using silica gel to provide 2.3 g. of a mixture of 1-eicocyl-2-oxo-4-carbomethoxy-3-pyrrolidine acetic acid and 1-eicocyl-6-oxo-3,4-piperidic acid dimethyl ester.

IR spectra: $V_{C=O}$ (ester) 1735 cm.$^{-1}$, $V_{C=O}$ (amide) 1695 cm.$^{-1}$ and 1645 cm.$^{-1}$.

Example 21

(1) Preparation of sodium N-(cyclopentyl)-lactam dicarboxylate: Into a one liter eggplant type flask there were charged 2 moles of 3-butene-1,2,3-tricarboxylic acid, (1,2-diethyl-3-methyl) ester, and 2 moles of cyclopentylamine. After mounting the flask on a vacuum distillator, the system was heated to 150° C. on an oil bath overnight. Thereafter, the flask was evacuated by means of an aspirator to completely remove ethanol formed by the reaction. Then, the system was subjected to distillation under reduced pressure using a vacuum pump.

Into a three-liter round bottom flask there were charged 542 g. of the principal distillate, 109.1 g. of sodium hydroxide equivalent to the distillate, and 2 liters of water. After fitting a reflux condenser thereto, the system was refluxed overnight. After the reaction was finished, the product was concentrated under reduced pressure (using an aspirator) until the total volume of product was 2.33 liters. The pH of the aqueous solution was 8.3–10, the discoloring range of phenolphthalein.

(2) Preparation of sodium N-(benzyl)-lactam dicarboxylate: Into a one liter eggplant flask there were charged 2 moles of 3-butene-1,2,3-tricarboxylic acid (1,2-diethyl-3-methyl) ester and 2 moles of benzylamine. After mounting the flask on a vacuum distillator, the system was heated to 150° C. by an oil bath. During heating, the system was slightly evacuated by means of aspirator to remove ethanol formed by the reaction. After the reaction was finished (about 7 hours), the system was further evacuated by means of a vacuum pump, and the temperature of the oil bath was increased to 200° C. and then further to 400° C. to distill the product. A mixture of the principal distillate, sodium hydroxide of an amount equivalent to the distillate and one liter of water were charged to a three-liter round bottom flask, and after fitting a reflux condenser thereto, the system was refluxed overnight. After the reaction was finished, the system was concentrated, under reduced pressure, using an aspirator. The pH of the aqueous solution of the sodium salt was adjusted to 8.3–10, the discoloring range of phenolphthalein.

The sodium N-(cyclopentyl)-lactam dicarboxylate, or the sodium N-benzyl-lactam dicarboxylate, prepared in methods (1) or (2), described above, was mixed with a silicone oil having a viscosity of 60 secs., n-propyl palmitate, and nonylphenyl pentaethylene oxide to provide blend oils A and B. For comparison, conventional blend oil C was prepared as shown in Table 3.

About 1% of each of the blend oils thus prepared was applied to nylon undrawn yarns by a roller oiling process, and the yarns were then drawn into filaments of 70 denier.

TABLE 3

| Composition | Oil A | Oil B | Oil C |
|---|---|---|---|
| Silicone oil (60 sec. in vis.) | 60 | 60 | 60 |
| n-Propyl palmitate | 10 | 10 | 10 |
| Sodium N-(cyclopentyl)-lactam dicarboxylate | 10 | | |
| Sodium N-(benzyl)-lactam dicarboxylate | | 10 | |
| Nonylphenyl pentaethylene oxide | 20 | 20 | 20 |

Note.—The viscosity of the silicone oil was measured by the Redwood method.

The frictional electricity and the frictional coefficient of the yarns thus obtained were measured by the following methods.

Measurement of frictional electricity.—The electricity generated on the nylon yarn when the yarn was passed through a small diameter controller at a speed of 100–300 meters/min. and at a tension of 0.1 g./denier at conditions of 27° C. and 40–67% RH was measured by means of a Kasuga-type potentiometer.

Measurement of frictional coefficient:

The yarn was passed at a speed of 100 meters/min. at conditions of 20–27° C. and 65–80% RH while contacting the yarn with a metal. The friction coefficient of the yarn during passage was measured.

The results obtained by the aforesaid procedures are shown in the following table.

TABLE 4

| Blend oil | Frictional electricity (v.) | Friction coefficient |
|---|---|---|
| A | −45 | 0.154 |
| B | −30 | 0.160 |
| C | −1,150 | 0.181 |

It is clear from the above table that the antistatic effect and frictional coefficient, that is, the smoothness of yarn with blend oils A and B of the present invention, were superior to those with conventional blend oil C.

Example 22

By repeating the same procedure as in Example 21 using laurylamine as the amine, sodium N-(lauryl)-lactam dicarboxylate was prepared, and by using the carboxylate, blend oil D of the present invention (shown in the following table) was prepared. For comparison purposes, conventional blend oils E, F and G were prepared.

TABLE 5

| Composition | Oil D | Oil E | Oil F | Oil G |
|---|---|---|---|---|
| Mineral oil (60 sec. in vis.) | 20 | 20 | 20 | 20 |
| Butyl stearate | 50 | 50 | 50 | 50 |
| Sodium N-(lauryl)-lactam dicarboxylate | 10 | | | |
| Phosphate of oleyl alcohol (EO)$_3$ | | 10 | | 5 |
| Sperm oil alcohol (EO)$_{10}$ | 20 | 20 | 20 | 20 |
| Sodium stearate | | | | 5 |

About 1% of each of the blend oils shown above was applied to 10 filaments (40 denier) of a nylon yarn, and the frictional electricity of the yarn was measured, the results of which are shown in the following table.

TABLE 6

| | Frictional electricity (volt) | | | | | |
|---|---|---|---|---|---|---|
| | Mild humidity (27° C.×67% RH) at— | | | High humidity (27° C.×40% RH) at— | | |
| Blend oil | 100* | 200* | 300* | 100* | 200* | 300* |
| D | −50 | 30 | 150 | −250 | −150 | 80 |
| E | −260 | −150 | −10 | −400 | −150 | 120 |
| F | −550 | −150 | 320 | −230 | 200 | 600 |
| G | 90 | 300 | 450 | −200 | −90 | 300 |

* Yarn velocity (meter/min.).

It is clear from the above table that the antistatic effect due to blend oil D of the present invention was excellent, and in particular, the change in the charge from positive to negative, in accordance with the variation in yarn speed which is specific to nylon yarn, could be remarkably reduced.

Example 23

The same procedure as in Example 21 was repeated using 2-ethylhexylamine as the amine to prepare sodium N-(2-ethylhexyl)-lactam dicarboxylate and by employing the carboxylate, blend oil H (shown in the following table) was prepared. For comparison purposes, conventional blend oils I, J, and K having the compositions shown in the same table were prepared. In the "conventional" oils, sodium N-(2-ethylhexyl)-lactam dicarboxylate was not compounded.

TABLE 7

| Composition | Oil H | Oil I | Oil J | Oil K |
|---|---|---|---|---|
| Mineral oil (60 sec. in viscosity) | 20 | 20 | | |
| Isoamyl stearate | 50 | 50 | | |
| Sorbitan monooleate | | | 15 | |
| Lauryl phthalate | | | | 60 |
| Sodium n-(2-ethylhexyl)-lactam dicarboxylate | 10 | | | |
| Sperm oil alcohol (EO)$_{10}$ | 20 | 20 | | |
| Castor oil (EO)$_{40}$ | | | 25 | |
| Quaternary salt of stearyl amine (EO)$_4$ oleic acid | | | 30 | |
| Octylphenol (EO)$_{10}$ | | | 25 | 10 |
| Stearyl alcohol (EO)$_7$(PO)$_7$ | | | | 20 |
| Sulfated oil | | | | 10 |
| Commerically available amphoteric surfactant | | 10 | 5 | |

Note.—PO means propylene oxide and EO means ethylene oxide.

About 0.8% of each of the blend oils shown above was applied to 13 filaments (40 denier) of a nylon yarn, and the frictional coefficient thereof was measured, the results of which are shown in the following table.

TABLE 8

| | Frictional coefficient | |
|---|---|---|
| | (20° C.×65% RH) | (27° C.×80% RH) |
| H | 0.169 | 0.901 |
| I | 0.178 | 0.229 |
| J | 0.232 | 0.252 |
| K | 0.216 | 0.236 |

It is clear from the above table that the smoothness of the yarn treated by the textile oil of the present invention was excellent, not only in middle humidity conditions but also in high humidity conditions.

Example 24

By conducting the same procedure as in Example 22, potassium N-(lauryl)-lactam dicarboxylate was prepared, and by mixing the dicarboxylate prepared with the same types and amounts of smoothing agent, antistatic agent and emulsifier used in the preparation of blend oil D in Example 22, blend oil L was prepared. Blend oil L and blend oils E and F in Example 22 were each applied in an amount of 1% to 24 filaments (70 denier) of a polyester, a polypropylene, a polyacrylonitrile, and an acetate, and the frictional electricity of the filaments under the conditions 27° C.×45% RH was measured. The results are shown in the following table, which shows that blend oil L gave excellent results.

TABLE 9

| Filament | Frictional electricity | | |
|---|---|---|---|
| | Oil L | Oil E | Oil F |
| Polyester | −70 | −85 | −650 |
| Prolypropylene | −40 | −120 | −920 |
| Polyacrylonitrile | −30 | 320 | 1,500 |
| Acetate | 10 | 270 | 1,100 |

Note.—Yarn speed 300 meters/min. Number of yarn: 15. Condition: 27° C. and 45% RH.

To further amplify upon some of the parameters of the present invention, generally, the basic catalyst is utilized in an amount of from about 0.001–10 mole percent. The amount of solvent utilized is generally from about 1–20 times the other components, although this is a most preferred range.

With respect to the formation of the triesters, anhydrides, or acid halides, most ordinary texts will contain references to the formation of these materials. Specifically, L. F. Fieser and M. Fieser Advanced Organic Chemistry, Reinhold Publishing Corporation, New York (1961), at pages 380, 390 contain a good description of the formation.

To further expand upon the examples, the "controller diameter" refers specifically to a waper. The size of the small controller can best be explained by describing the controller as a waper provided with 15 bobbin rods. The above description is well known to those skilled in the art.

To define the test metal utilized in the examples, this was an iron bar gilded with chrome, having a total diameter of 13 millimeters.

The amphoteric surfactant (Table 7) was an alkyl imidazoline. This is essentially non-critical to the invention.

Finally, in Example 17, the temperature was 150° C.

What is claimed is:

1. A compound selected from the group consisting of a lactam dicarboxylic acid represented by the formula

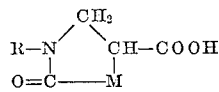

wherein R represents a member selected from the group consisting of a hydrogen atom an alkyl group having less than 20 carbon atoms, a cycloalkyl group having 5–12 carbon atoms, phenyl, tolyl, naphthyl, benzyl and phenethyl and M represents a member selected from the group consisting of

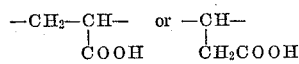

and derivatives of said lactam dicarboxylic acid selected from the group consisting of:
a metal salt derivative wherein said metal is selected from the group consisting of an alkali metal, an alkaline earth metal, silver, zinc, copper, nickel and iron;
an ester derivative selected from the group consisting of a dialkyl ester having less than 6 carbon atoms and a dialkyl ester having less than 6 carbon atoms substituted with a member from the first group consisting of a phenyl group, a cyclohexyl group, a benzyl group, and a member from said first group substituted with a member selected from the class consisting of a tolyl group, a methylhexyl group and a 4-methylbenzyl group; and an amide derivative which is derived from the group consisting of ammonia and primary amines having less than 20 carbon atoms selected from the class consisting of alkyl amines, cycloalkyl amines, aniline, tolylamine, naphthylamine, benzylamine and phenethylamine.

2. The compound of claim 1 wherein R is an alkyl group having less than 20 carbon atoms.

3. The compound of claim 1 wherein said derivative of the lactam dicarboxylic acid is a dialkyl ester of the lactam dicarboxylic acid, wherein said alkyl group of said ester has less than 6 carbon atoms.

4. The compound of claim 1 wherein said metal salt is selected from the group consisting of sodium salts and potassium salts.

5. A process for the preparation of a compound selected from the group consisting of a diester and a diamide of a lactam dicarboxylic acid represented by the formula

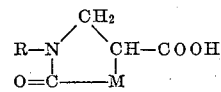

wherein R represents a member selected from the group consisting of a hydrogen atom and a hydrocarbon group having less than 20 carbon atoms, and M represents a member selected from the group consisting of

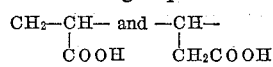

which comprises reacting a 3-butene-1,2,3-tricarboxylic acid triester with a member selected from the group consisting of ammonia and a primary amine having less than 20 carbon atoms.

6. The process of claim 5 wherein the reaction temperature is from about 0° C. to about 300° C.

7. The process of claim 5 wherein the reaction temperature is from about 20° C. to about 200° C.

8. The process of claim 5 wherein from about 1–15 moles of a member selected from the group consisting of ammonia and a primary amine is used per 1 mole of the 3-butene-1,2,3-tricarboxylic acid triester.

9. The process of claim 5 wherein the reaction is carried out in the presence of a basic catalyst.

10. The process of claim 9 wherein said basic catalyst is selected from the group consisting of an alkali metal hydroxide, an alkali metal alkoxide, and a tertiary amine.

11. The compound of claim 1 wherein M is

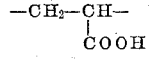

12. The compound of claim 1 wherein M is

13. The compound of claim 2 wherein said alkyl group is selected from the class consisting of a methyl group, an ethyl group, a propyl group, a butyl group, a hexyl group, a heptyl group, an octyl group, a nonyl group, a dodecyl group, a tetradecyl group, a hexadecyl group, an octadecyl group, and an eicocyl group.

14. The compound of claim 1 wherein said amide derivative is derived from a primary amine selected from the class consisting of methylamine, ethylamine, hexylamine, octylamine, nonylamine, propylamine, butylamine, decylamine, dodecylamine, tetradecylamine, hexadecylamine, octadecylamine, eicocylamine, cyclopentylamine, cyclohexylamine, cyclooctylamine, cyclododecylamine, aniline, tolylamine, naphthylamine, benzylamine and phenylethylamine.

15. The process of claim 5 wherein said hydrocarbon group is selected from the class consisting of an alkyl group having less than 20 carbon atoms, a cycloalkyl group having 5-12 carbon atoms, a monocyclic aryl group having 5-12 carbon atoms and a monocyclic arylalkyl group having 5-12 carbon atoms.

16. The process of claim 5 wherein M is

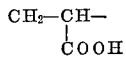

17. The process of claim 5 wherein M is

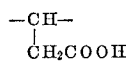

18. The process of claim 5 wherein the process results in a mixture of 5-membered and 6-membered compounds having the recited formula.

19. The process of claim 18 wherein the proportion of the 6-membered compound is 5-80% by weight of the total product.

20. The process of claim 9 wherein the amount of catalysts is from about 0.001-10 mole percent.

21. The process of claim 5 wherein said reaction is conducted in an organic solvent present in an amount of from about 1-20 times the amount of all other components.

22. The process of claim 21 wherein said organic solvent is selected from the group consisting of aliphatic hydrocarbons, aromatic hydrocarbons and ethers.

23. The process of claim 5 wherein said compound is the diester of said lactam dicarboxylic acid.

24. The process of claim 23 wherein said diester is a dialkyl ester wherein said alkyl group has less than 6 carbon atoms.

25. The process of claim 5 wherein said compound is the diamide of said lactam dicarboxylic acid.

26. The process of claim 5 wherein the ester portion of said triester comprises an alkyl group having less than 6 carbon atoms.

References Cited

Sugawa: Yakugaku Zasshi 78, 853-6 (1958); C.A. 53:332f.

HENRY R. JILES, Primary Examiner

G. T. TODD, Assistant Examiner

U.S. Cl. X.R.

117—138.5, 138.8 B, 139.5 CQ; 252—8.8; 260—75 N, 78 P, 326.3, 270, 293.65, 293.76, 293.73, 293.81, 293.72, 293.86, 293.88.